US008725000B2

(12) United States Patent
Weaver (10) Patent No.: US 8,725,000 B2
(45) Date of Patent: May 13, 2014

(54) THERMAL DRIFT COMPENSATION SYSTEM AND METHOD FOR OPTICAL NETWORKS (75) Inventor: Thomas L. Weaver, Webster, MO (US)

(73) Assignee: The Boeing Company, Chicago, IL (US)

(*) Notice: Subject to any disclaimer, the term of this patent is extended or adjusted under 35 U.S.C. 154(b) by 386 days.

(21) Appl. No.: 12/816,880

(22) Filed: Jun. 16, 2010

(65) Prior Publication Data

US 2010/0278529 A1 Nov. 4, 2010

Related U.S. Application Data (63) Continuation of application No. 11/200,295, filed on Aug. 9, 2005, now Pat. No. 7,773,885.

(51) Int. Cl.
H04B 10/00 (2013.01)

(52) U.S. Cl.
USPC .......................................... 398/129

(58) Field of Classification Search
USPC ............... 398/33, 94, 95, 115, 154, 196–198
See application file for complete search history.

(56) References Cited

U.S. PATENT DOCUMENTS

| 5,504,608 | A | * | 4/1996 | Neeves et al. | 398/79 |
|---|---|---|---|---|---|
| 5,825,792 | A | | 10/1998 | Villeneuve et al. | |
| 5,838,470 | A | | 11/1998 | Radehaus et al. | |
| 6,363,089 | B1 | * | 3/2002 | Fernald et al. | 372/20 |
| 6,548,806 | B1 | | 4/2003 | Chung et al. | |
| 6,810,168 | B1 | * | 10/2004 | Feng et al. | 385/24 |
| 6,917,455 | B2 | | 7/2005 | McBrien et al. | |
| 6,961,128 | B2 | | 11/2005 | Park | |
| 7,068,950 | B2 | | 6/2006 | Sinsky | |
| 7,162,164 | B2 | * | 1/2007 | Brown et al. | 398/183 |
| 7,463,832 | B2 | | 12/2008 | Weaver | |
| 7,636,522 | B2 | * | 12/2009 | Nagarajan et al. | 398/79 |
| 7,693,420 | B2 | | 4/2010 | Weaver | |
| 7,773,885 | B2 | | 8/2010 | Weaver | |
| 2003/0016413 | A1 | | 1/2003 | Carrick et al. | |
| 2003/0063636 | A1 | | 4/2003 | Sasaki | |
| 2003/0072053 | A1 | | 4/2003 | Weaver et al. | |
| 2003/0152390 | A1 | | 8/2003 | Stewart et al. | |
| 2004/0196534 | A1 | | 10/2004 | Obeda et al. | |

FOREIGN PATENT DOCUMENTS

EP 1182807 A2 2/2002
WO WO-00 38283 A1 6/2000

* cited by examiner

Primary Examiner — Danny Leung
(74) Attorney, Agent, or Firm — Harness, Dickey & Pierce, P.L.C.

(57) ABSTRACT

A method for correcting for optical channel bandwidth misalignment between output passbands of a first optical device and input passbands of a second optical device. The method may involve transmitting a plurality of optical signals from the output passbands of the first optical device, with each of the optical signals being transmitted within an associated one of the passbands of the output. The first plurality of optical signals may be received within the input passbands of the second optical device. The optical signals may be analyzed to determine if the passbands of the first optical device or the second optical device has shifted. A characteristic of a filter through which the optical signals pass may be altered to cause a needed degree of shifting of wavelength bands of the optical signals to bring the optical signals into alignment within the passbands of the second optical device.

13 Claims, 8 Drawing Sheets

THERMAL DRIFT COMPENSATION SYSTEM AND METHOD FOR OPTICAL NETWORKS

CROSS-REFERENCE TO RELATED APPLICATIONS

This application is a continuation of U.S. application Ser. No. 11/200,295, filed Aug. 9, 2005, now U.S. Pat. No. 7,773,885, and is generally related to U.S. application Ser. No. 11/200,290, filed Aug. 9, 2005, now U.S. Pat. No. 7,693,420 and U.S. application Ser. No. 11/200,294, filed Aug. 9, 2005, now U.S. Pat. No. 7,463,832.

STATEMENT OF GOVERNMENT RIGHTS

This invention was made with Government support under Contract Number FA8650-04-C-3416 awarded by the U.S. Air Force. The U.S. Government has certain rights in this invention.

FIELD OF THE INVENTION

The present invention relates to the detection of thermal drift in optical devices, and more particularly to the detection, monitoring and correction for a thermal drift in optical devices employing a plurality of independent optical channels.

BACKGROUND OF THE INVENTION

Electromagnetic interference (EMI) has been a challenge of long standing with mobile platform, and particularly with aircraft electronic systems. The development of fly-by-wire control systems to reduce vehicle weight and volume increases the risk of EMI. The possible use of EMI weapons to disrupt electronic subsystems used on various forms of mobile platforms and, particularly on commercial and military aircraft, poses an additional consideration that will likely gain in importance with time.

The use of "fly-by-light" systems would eliminate the risk of EMI to various electronic systems used on mobile platforms. However, fly-by-light systems are difficult to build in a form that is both robust enough to operate in aerospace environments, and which have sufficient capability of dealing with the larger number of data and controls points in a vehicle control network implemented on a mobile platform, for example, an aircraft. Nevertheless, the use of optic technologies represents one potential way to reduce the volume and mass of the traditionally used integration and control networks implemented on mobile platforms.

A principal obstacle in implementing optics based control networks in aerospace applications has been the somewhat limited number of independent optical signals that can be transmitted per optical path (i.e., per optical fiber). Thus, a key consideration in making the use of an optical based control network practical in an aerospace application is the ability to increase the number of wavelength channels that can be implemented on each optic path. However, in aerospace applications, where various components being controlled by optical signals may be exposed to harsh environments and experience significant temperature changes, thermal drift of the wavelength bands associated with the optical channels of a given optical component must be addressed. If thermal drift could be readily compensated for, then the wavelength bands defining the independent optical channels could be placed closer together than what would be possible in a thermally uncompensated for system. This would allow a greater number of wavelength bands to be used in a given optical medium, for example, on a single optical fiber.

One approach to controlling thermal drift is employed in the telecommunications industry where presently up to 64 separate wavelength division multiplexing (WDM) channels can be put on a single optical fiber. Implementing this number of separate WDM channels requires very close control of the wavelengths that define each WDM channel. The telecommunication industry's approach to controlling thermal drift is to put all temperature sensitive devices on thermal control units which control the temperature of the devices to within about 0.1° C. Those devices are placed inside temperature control enclosures which control the temperature to within about 2.0° C. On land, the enclosures are placed in temperature control buildings. At sea, the disclosures are placed at ocean depths of known constant temperature. Obviously, this degree of temperature control is impossible and/or impractical to implement in aerospace applications. In aerospace applications, forcing large numbers of optical signals onto one fiber does not produce the overwhelming cost benefits that it does for telecommunication applications. Aerospace applications typically involve fewer signals to send, over shorter distances, and inside a vehicle. As a result, the cross complexity and mass that would be required to be added into a mobile platform, in the form of complex transmitters and receivers used to put large numbers of signals on single optical fibers, does not give aerospace applications the same cost savings that are present for telecommunication applications.

To the contrary, the requirements of aerospace applications can be met by an optical based signal in which relatively modest numbers (i.e., typically 20 or less) signals are placed on a single optical fiber. This would allow operating wavelengths to be spaced sufficiently far from each other and the wavelength bands of the various devices made sufficiently wide, such that the use of optical fibers becomes more practical in an aerospace application. Then, the temperatures of the optical devices being controlled on the mobile platform can be allowed to drift, since because of the larger spacing between bands, the signals cannot cross into each others' bands. Furthermore, if sufficiently large bandwidth channels are employed, then some signals will always pass through their designated channels, even when the bands (i.e., channels) on a transmitter and those of the other optical component receiving the optical signals, such as a router, do not accurately align.

The drawback with the above described approach is that even in a typical aerospace application in which the transmitter and receiver are located together, so that they are exposed to the same ambient temperature, the optical devices that they communicate with, such as optical routers, are typically located remotely from the receiver/transmitter. As a result, the remotely located optical routers are likely to be exposed to, and therefore operating at, different temperatures from the receiver/transmitter. In aerospace applications, this difference in temperature can be significant. The large temperature range that various, remotely located optical devices may be exposed to can cause large wavelength drifts in the input filters used with such devices. For an optical based system to work with large temperature drifts, the wavelength bands must be so wide and so widely spaced apart that only a very limited (i.e., insufficient) number of bands can be fit into a useable optical spectrum on a given optical fiber.

Thus, it would be highly desirable to provide some means for compensating for thermal drift in optical components, such as optical routers, employed on a mobile platform where the optical device can be expected to experience significantly different thermal environments from those being experienced by a transmitter/receiver that is also being carried on the mobile platform. Accurately determining the thermal drift of the wavelength bands of the optical device and compensating for the thermal drift, without the need to control the temperature of the optical device (i.e., allowing the temperature of the optical device to "float"), would allow a sufficiently large number of wavelength bands to be implemented on a given optical medium to make use of an optical based system more practical in aerospace and other applications.

SUMMARY OF THE INVENTION

In one aspect the present disclosure relates to a method for correcting for optical channel bandwidth misalignment between output passbands of a first optical device and input passbands of a second optical device. The method may comprise transmitting a plurality of optical signals from the output passbands of the first optical device, with each of the optical signals being transmitted within an associated one of the passbands of the output. The first plurality of optical signals may be received within the input passbands of the second optical device. The optical signals may be analyzed to determine if the passbands of the first optical device or the second optical device has shifted. A characteristic of a filter through which the optical signals pass may be altered to cause a needed degree of shifting of wavelength bands of the optical signals to bring the optical signals into alignment within the passbands of the second optical device.

In another aspect the present disclosure relates to a method for correcting for optical channel bandwidth misalignment between output passbands of a first optical device and input passbands of a second optical device. The method may comprise transmitting a plurality of optical signals from the output passbands of the first optical device, with each of the optical signals being transmitted within an associated one of the passbands of the output. A filter may be disposed between the first and second optical devices such that the optical signals are required to pass through the filter prior to being received by the second optical device. The first plurality of signals may be received within the input passbands of the second optical device. A controller may be used to obtain stored information from a lookup table to analyze the optical signals to determine if the passbands of the first optical device or the second optical device has shifted. The controller may be used to alter a characteristic of a filter through which the optical signals pass to cause a needed degree of shifting of wavelength bands of the optical signals to bring the optical signals into alignment within the passbands of the second optical device.

In still another aspect the present disclosure relates to a method for correcting for optical channel bandwidth misalignment between output passbands of a first optical device and input passbands of a second optical device. The method may comprise transmitting a plurality of optical signals from the output passbands of the first optical device, with each of the optical signals being transmitted within an associated one of the passbands of the output. A filter may be disposed between the first and second optical devices such that the optical signals are required to pass through the filter prior to being received by the second optical device. The first plurality of optical signals may be received within the input passbands of the second optical device. Stored information may be used to analyze the received first plurality of optical signals to determine if a passband of the first optical device or the second optical device has shifted. The stored information may be used to alter a position of a filter through which the optical signals pass to cause a needed degree of shifting of wavelength bands of the optical signals to bring the optical signals into alignment within the passbands of the second optical device.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein.

DETAILED DESCRIPTION

The following description of the preferred embodiment(s) is merely exemplary in nature and is in no way intended to limit the invention, its application, or uses.

Figure 1:
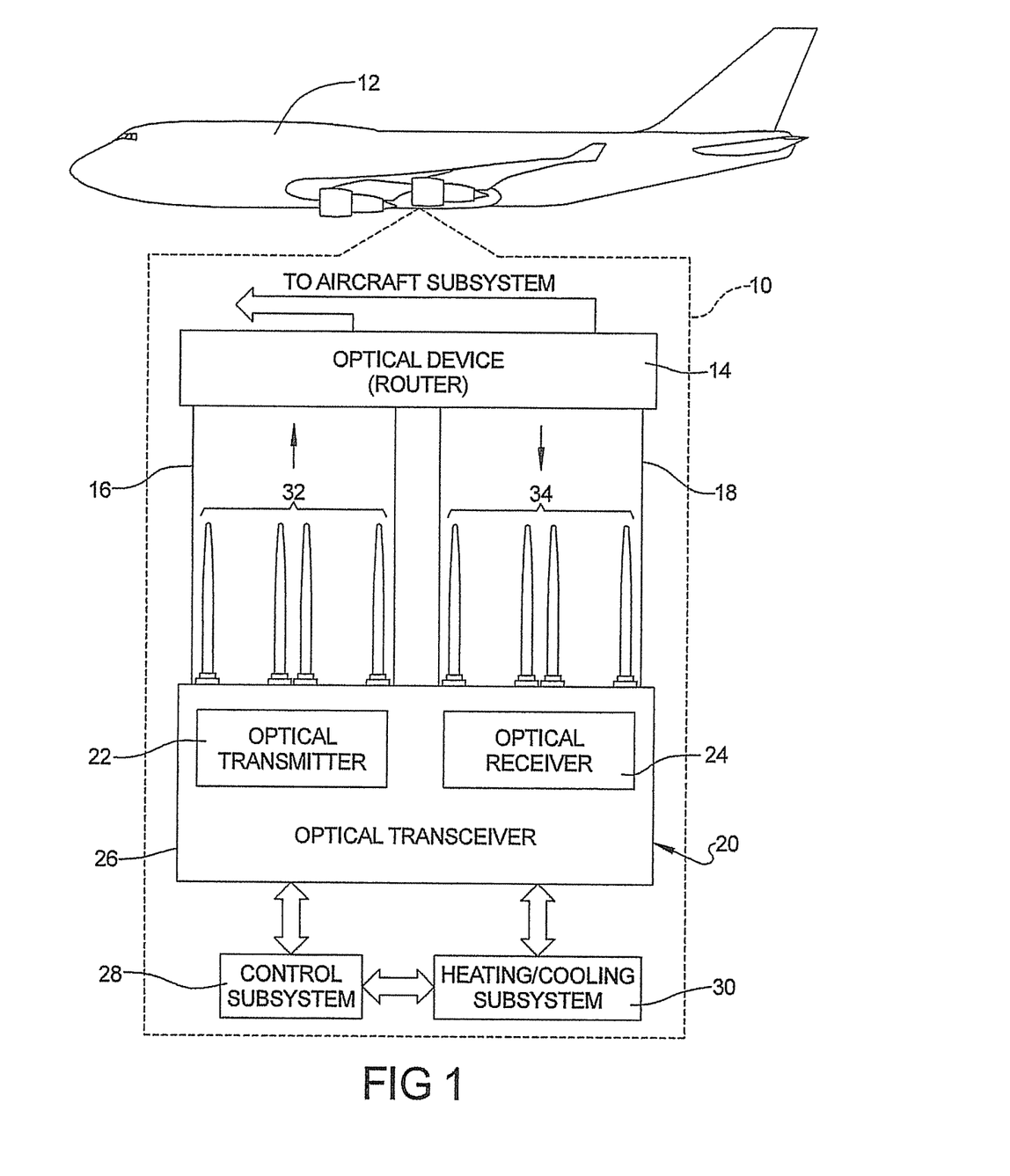
FIG. 1 is a simplified block diagram of a preferred embodiment of the system of the present invention.

Referring to FIG. 1, there is shown a system 10 in accordance with a preferred embodiment of the present invention. While the system 10 is shown as being implemented on aircraft 12, it will be appreciated that the system 10 could be implemented on any mobile platform where an optical control network is desired. The system 10 could also be employed in a fixed structure where an optical system is desired, and where an optical control device of the network is to be located in an ambient environment that causes the optical device to experience significant temperature changes that differ from those experienced by an optical transmitter.

The system 10, in this example, includes an optical device 14 in the form of an optical router coupled via a pair of optical fibers 16 and 18 with an optical transceiver 20. The optical transceiver 20 includes an optical transmitter 22 and an optical receiver 24 located within a common housing or enclosure 26. The optical transceiver 20 is in bi-directional communication with a control subsystem 28. The optical transceiver 20 is also in communication with a heating/cooling subsystem 30. The control subsystem 28 is further in bi-directional communication with the heating/cooling subsystem 30. The control subsystem 28 can be an independent subsystem as shown in FIG. 1 or it can be integrated into the transmitter 22.

While only two optical fibers 16 and 18 have been illustrated in FIG. 1, it will be appreciated that typically a larger number, for example, 4-8 optical fibers will be coupled between the optical transceiver 20 and the optical router 14. Also, while optical fibers 16 and 18 have been used for explanation purposes, other optical media such as free space, photonic bandgap fibers, or photonic crystals could be employed in lieu of optical fibers. Also, while an optical router will be used for purposes of explanation, it will be appreciated that the teachings of the present application could be used with any form of optical multiplexer, de-multiplexer, "add-drop", or other component where changing operating temperature of the device will cause thermal drifting of it optical channels.

With the present system 10, wavelength division multiplexing (WDM) is used to transmit a plurality of narrow band optical signals 32 over optical fibers 16 from the optical transmitter 22 to the optical router 14. The optical router 14 routes the signals as needed to various aircraft subsystems which are typically clustered together in groups, for example, groups of 12 to 16 components. This will be further explained in the following paragraphs.

The optical router 14 typically includes a filter having a plurality of wavelength bands which may also be termed "passbands". The optical device 14 receives each one of the optical signals 32 within a specific passband and returns an optical signal 34 over a corresponding passband to the optical receiver 24. Thus, each passband forms a separate optical channel. Due to the fact that the optical transceiver 20 is located in a different location in the mobile platform 12 than the optical router 14, the router 14 will often be experiencing a different ambient temperature than the optical transceiver 20. If the optical router 14 is warmer than the optical transceiver 20, than the router will shift all of its passbands in one direction, but if it is lower in temperature than the optical transceiver, than the optical router 14 will shift all of its passbands in the opposite direction. The control system 28 is used to monitor the received signals 34 and to shift the transmitted signals 32 so that the wavelength centers of each of the signals 32 match the centers of the passbands of the optical router 14. The control system 28 does this by controlling the heating/cooling subsystem 30 to either heat or cool the transmitter portion 22 of the optical transceiver 20 as needed to cause shifting of the optical signals 32 such that their wavelength centers remain centered within the passbands of the optical router 14. In this manner, the system 10 essentially forms a "closed loop" end system in which the received optical signals 34 are monitored and the temperature of the optical transceiver 20 is continuously controlled, in real time, via the heating/cooling subsystem 30. This enables the optical signals 32 to "track" the shifting passbands of the optical router 14.

Figure 2:
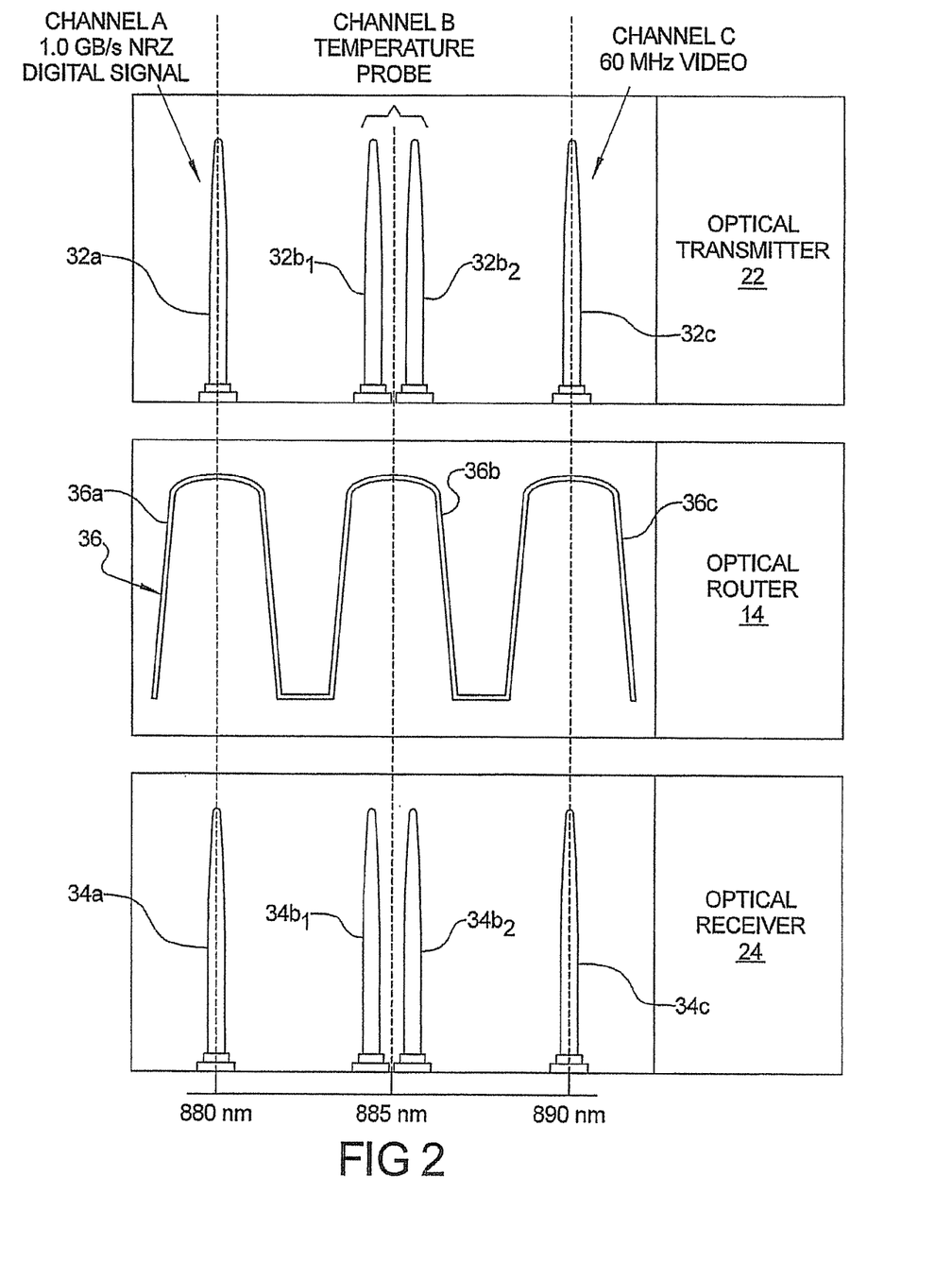
FIG. 2 is a diagram of signals being transmitted between an optical transmitter and an optical receiver via a remotely located optical router, illustrating alignment of the passbands of the router when the router is at the same temperature as the receiver and transmitter.

Referring now to FIG. 2, the operation of the system 10 will be further described in connection with a simplified diagram of the passbands 36 used by the optical router 14. In this diagram, the optical transmitter 22 and the optical receiver 24 are illustrated on opposite sides of the optical router 14 merely to aid in explaining the alignment of the optical signals 32 and 34 with the passbands 36. However, the transmitter 22 and receiver 24 are actually located together in housing 26, as shown in FIG. 1.

By way of background, it will be understood that a typical optical filter shifts its passband by about 0.026 nm per degree C. Over a 180° C. range from −55° C. to +125° C. range, the passbands of the router shift by about 4.7 nm. Without the thermal drift compensation of the present invention this large of a passband shift would require passbands that are about 8 nm wide and on 10.0 nm centers. However, 10 nm spacing of 8 nm bands means that 48 nm of wavelength are required to carry just four optical signals. But four signals (i.e., channels) per optical fiber is insufficient to be beneficial from a cost/benefit standpoint in aerospace applications. Furthermore, if these signals needed to be amplified, two separate amplifiers would be required because present day amplifiers have a useable gain bandwidth of only about 40 nm.

Temperature adjustment of the transmitter 22 is made practical by the fact that many lasers and tuned optical receivers have a wavelength drift with temperature of approximately 0.4 nm per degree C. This is much larger than the 0.026 nm per degree C. drift of the passband filters used in the optical router 14. This means that while the optical router 14 may experience temperature variations over a 180° C. range, which produce 4.7 nm wavelength shifts, the transceiver 20 can track the wavelength shifts by having its temperature adjusted over only a 4.7 nm/0.4 nm/° C.=11.75° C. range.

Thus, using the heating/cooling subsystem 30 to control the optical transceiver 20 over only an 11.75° C. range enables the wavelength centers of the optical signals to be shifted as needed to compensate for the much larger temperature variation that the optical router 14 experiences.

With further reference to FIG. 2, detecting the thermal drift of the passbands of the router 14 is accomplished by generating two narrow band optical signals as a "first" or "temperature probe" optical signal $32b_1$, $32b_2$. The first optical signal pair $32b_1$, $32b_2$ is centered within a passband $36b$ of the optical router 14, which can be viewed as "channel B". Optical signals $32a$ and $32c$ are transmitted in passbands $36a$ and $36c$ respectively (channels A and C). The passbands $36a$-$36c$, in this example, are illustrated as having 4 nm wavelength bands positioned on 5 nm spacing. If the passbands $36a$-$36c$ of the router 14 have their centers aligned with the optical signals $32a$-$32c$, then the magnitude of the signals $34a$-$34c$ transmitted back by the router 14, and received by the optical receiver 24, will each be approximately the same magnitude as their corresponding signals $32a$-$32c$.

Figure 3:
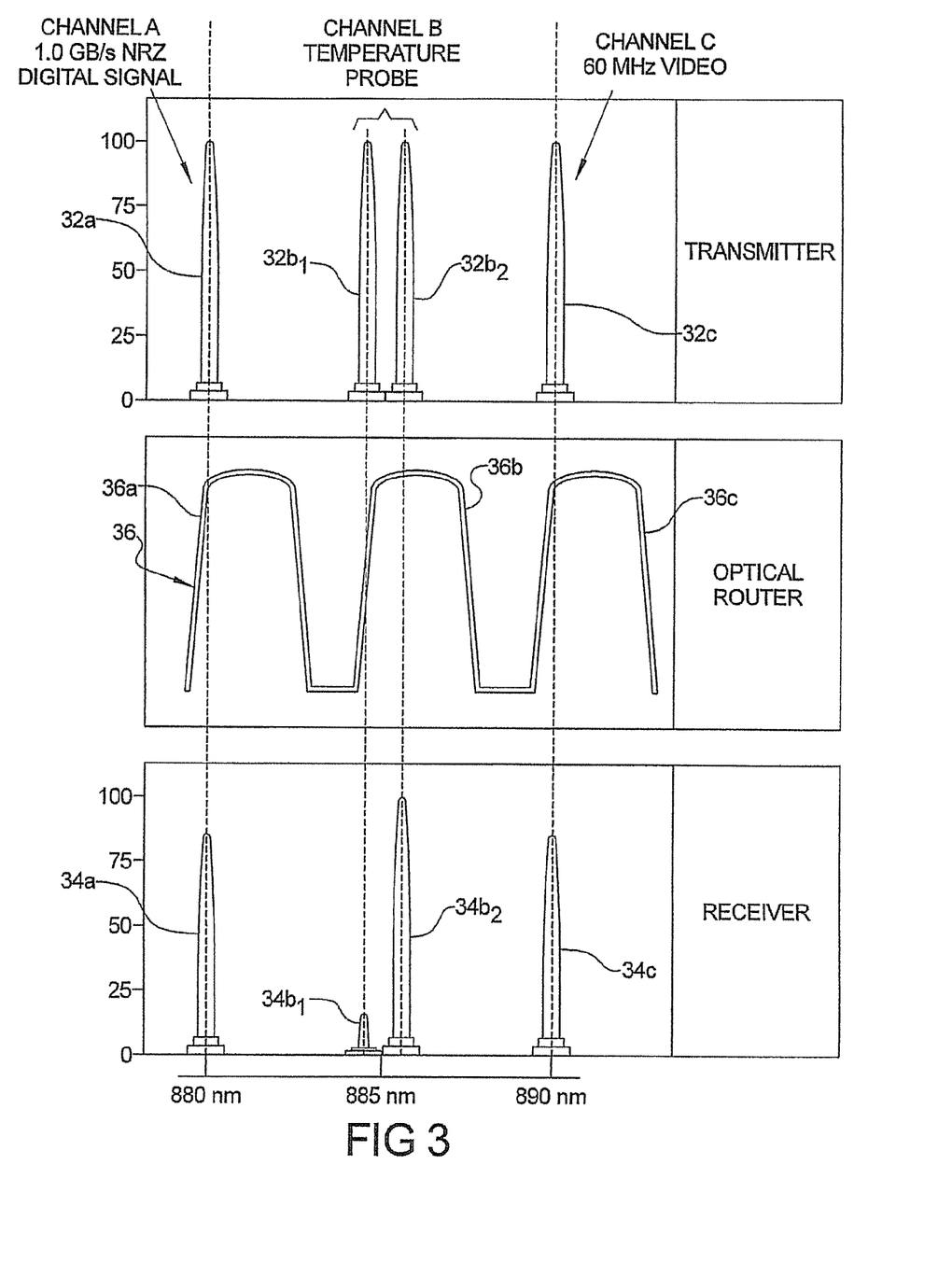
FIG. 3 is a diagram illustrating misalignment of the passbands of the optical router and the result of this misalignment on the optical signals being received at the receiver.

Referring to FIG. 3, if the passbands $36a$ have shifted because of the optical router 14 being at a different temperature from the optical transceiver 20, then the centers of the passbands $36a$ will be shifted from the wavelength centers of the optical signals $32a$-$32c$. In this instance, one or the other of the first pair of optical signals $32b_1$ and $32b_2$ will be attenuated when it is received by the optical router 14. In this example, since the passbands $36a$-$36c$ have shifted upwardly in wavelength (downwardly in frequency), optical signal $32b_1$ will be attenuated significantly as compared to signal $32b_2$ because of being cutoff by the rolloff of passband $36b$. This is due in part to the fact that the passbands $36a$-$36c$ do not have perfectly flat tops, but rather rounded tops. By using the pair of optical signals $32b_1$ and $32b_2$ and spacing these narrow band optical signals both within a 4 nm wavelength band, the attenuation of one or other can be detected. It will also be noted that signals $32a$ and $34c$ are also slightly reduced in intensity as a result of no longer being centered at the wavelength centers of the passbands $36a$ and $36c$, respectively.

The control subsystem 28 monitors the second pair of signals $34b_1$ and $34b_2$ sent by the optical router 14 and from the degree of attenuation of one or the other of this pair of signals, as well as which one of the pair is attenuated, determines the degree of thermal shift of the passbands 36a-36c of the optical router 14. The control subsystem 28 causes the heating/cooling subsystem 30 to heat or cool the transmitter 22 as needed to apply a real time correction to the narrow band lasers used in the optical transmitter 22. The correction shifts the signals 32a-32c either higher or lower along the wavelength spectrum so that the centers of the optical signals 32a-32c are centered with the passbands 36a-36c of the optical router 14.

Thus, the system 10 does not attempt to control the temperature of the optical router 14, but instead focuses on controlling the temperature of the optical transmitter 22 in a manner that induces a controlled amount of thermal shifting of the signals 32a-32c from the transmitter as needed to match the thermal shifting of the passbands 36a-36c. This enables the received signals 34a-34c received by the optical receiver 24 to be maintained as strong in magnitude as possible.

The second significant benefit of this approach is that the passbands 36a-36c can each be made much narrower. This enables wavelength division multiplexing (WDM) of optical signals to be made practical for aerospace applications where devices needing separate wavelengths are usually clustered in groups (typically of 12 to 16). As one specific example, one motor in an aerospace electrical actuator may send 12 separate optical sensor signals to a flight control computer. Without the temperature compensation of the present invention, wavelength division multiplexing channels of an optical router would need to be spaced 10 nm apart and only 4 signals could be put into a single optical fiber. Consequently, 6 fibers (3 excitation fibers, where each carries 4 excitation signals to the sensors via the router, and 3 fibers bringing the modulated signals back via the router) would need to be used to excite and collect signals from the 12 sensors. However, if the passbands can be put on 3.3 nm centers, then one fiber may carry 12 signals and only 2 (1 fiber going out and one coming back) would be needed for actuator motor sensing in this example. Reducing the total optical fiber count becomes especially important at a flight control computer because if a vehicle has a dozen flight control surfaces there will typically be 12 actuators (one for each flight control surface). If each actuator has two motors and if there are 4 wavelengths in a fiber, there would need to be 144 fibers (12 actuators×2 motors per actuator×6 fibers per motor), just for sensing purposes alone, that will need connector space on the face of the flight control computer. With 12 wavelengths in a single fiber, there would only need to be 48 fibers connected to the face of the flight control computer.

The system and method 10 of the present invention thus allows the use of an optical network to be implemented on a mobile platform with significantly fewer optical fibers being required for a given implementation. The system and method 10 further eliminates concerns with EMI that would otherwise be present with fly-by-wire control systems. The system and method 10 further reduces the mass, complexity and cost of an optical control network by its ability to "squeeze" more optical channels onto a given optical fiber without the risk of performance degradation that would be otherwise incurred from the thermal drift experienced by the optical router 14.

Figure 4:
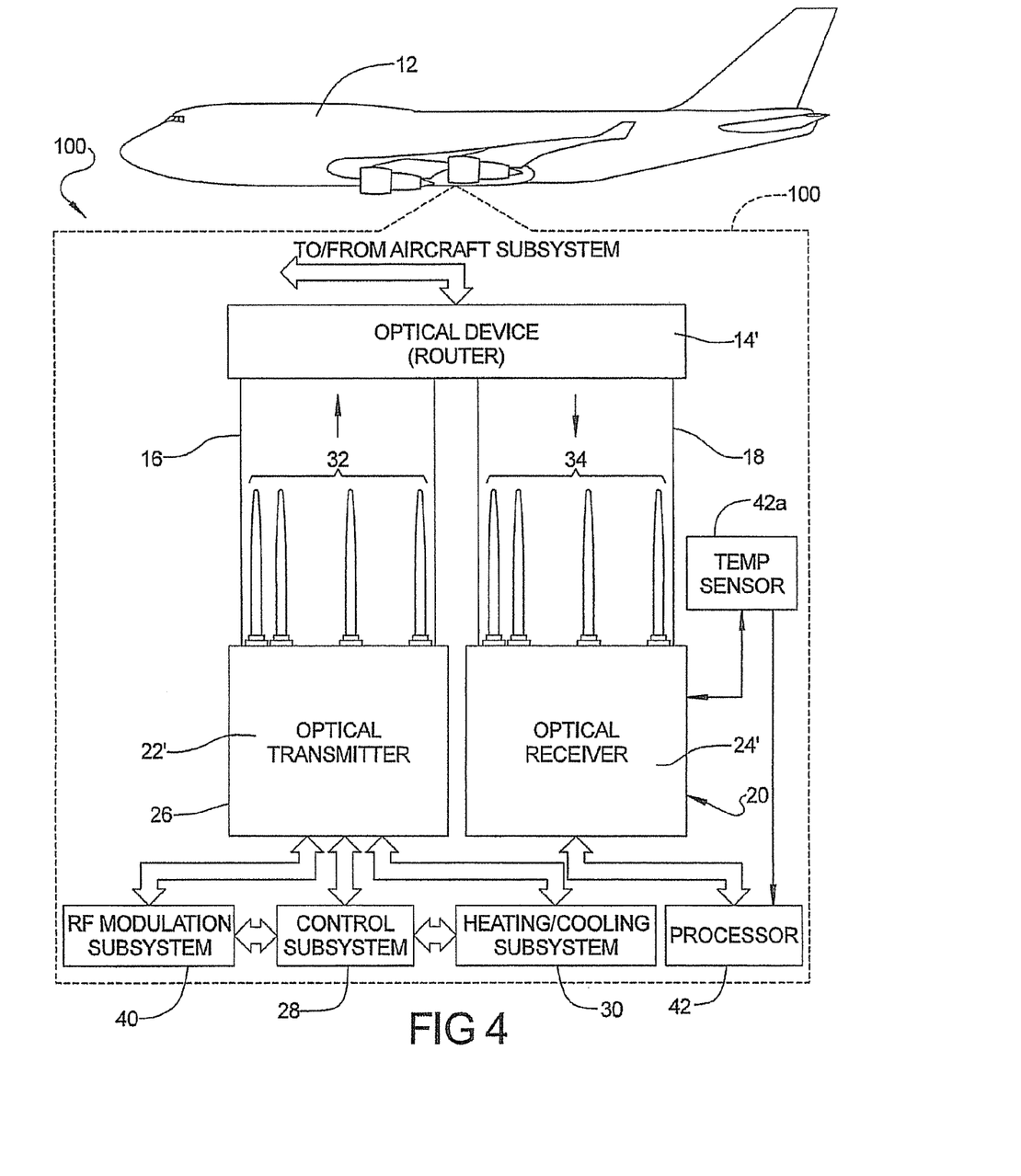
FIG. 4 is a simplified block diagram of an alternative preferred embodiment of the present invention incorporating a subsystem for modulating RF signals onto the optical signals transmitted from the transmitter to the optical router and a subsystem for detecting the RF modulated optical signals at the receiver.

Referring to FIG. 4, an alternative preferred implementation of the present invention is illustrated and designated by reference numeral 100. Components in common with system 10 have been labeled with corresponding reference numerals having a prime (') symbol. With the system 100, the optical transmitter 22' and the optical receiver 24' are no longer located within a common housing or enclosure, but are instead located remote from each other. In addition, the optical device 14' is located remotely from the optical transmitter 22' and the optical receiver 24'. Since the optical transmitter 22' and optical receiver 24' are not located in a common enclosure, they will not necessarily experience the same ambient temperature, and thus may not be at the same operating temperature. Thus, the passbands at the output of the optical device 14' may not be aligned with the passbands at the input of the optical receiver 24', and the passbands at the input of the optical receiver 24' will not necessarily track the wavelength centers of the transmitted signals from the optical transmitter 22'. In this instance the thermal drift of the optical receiver 24' cannot simply be controlled by heating/cooling it via the heating/cooling subsystem 30' because the optical transmitter 22' and the optical receiver 24' are located remotely from each other. Moreover, the optical receiver 24' may be located in an avionics bay or at some other area where it would be undesirable to attempt to heat the optical receiver 24'. Thus, an alternative system is needed for detecting when the optical device 14' is operating at a different temperature from the optical receiver 24', and thus introducing misalignment of the passbands at the output of the optical device 14' with the passbands of an input filter of the optical receiver 24'. This embodiment accomplishes detection of this router 14'/ receiver 24' passband misalignment by impressing a unique (i.e., different) radio frequency (RF) modulation signal from an RF modulation subsystem 40 onto each of the optical signals 32a, 32b and 32c. A processor 42 is used in connection with the optical receiver 24' to detect when an RF modulated optical signal is being received in a passband that it should not be received in, thus indicating misalignment of the two passbands.

A variety of different types of signals can be readily impressed on the continuous wave outputs of the narrowband lasers used to form the optical signals 32. For example, sinusoidal excitation signals such as AM, FM and Phase Modulation (PM) could be employed. Digital signals could also be modulated onto the optical signals 32a-32c, and separated from each other by alternating them with analog signals. In either event, the RF modulations allow positive identification of each of the optical signals 32a-32c, even in the event that temperature-induced wavelength drift of the receiver 24' causes a signal from one channel of the router 14' to cross into an adjacent channel at the receiver 14' input.

Figure 5:
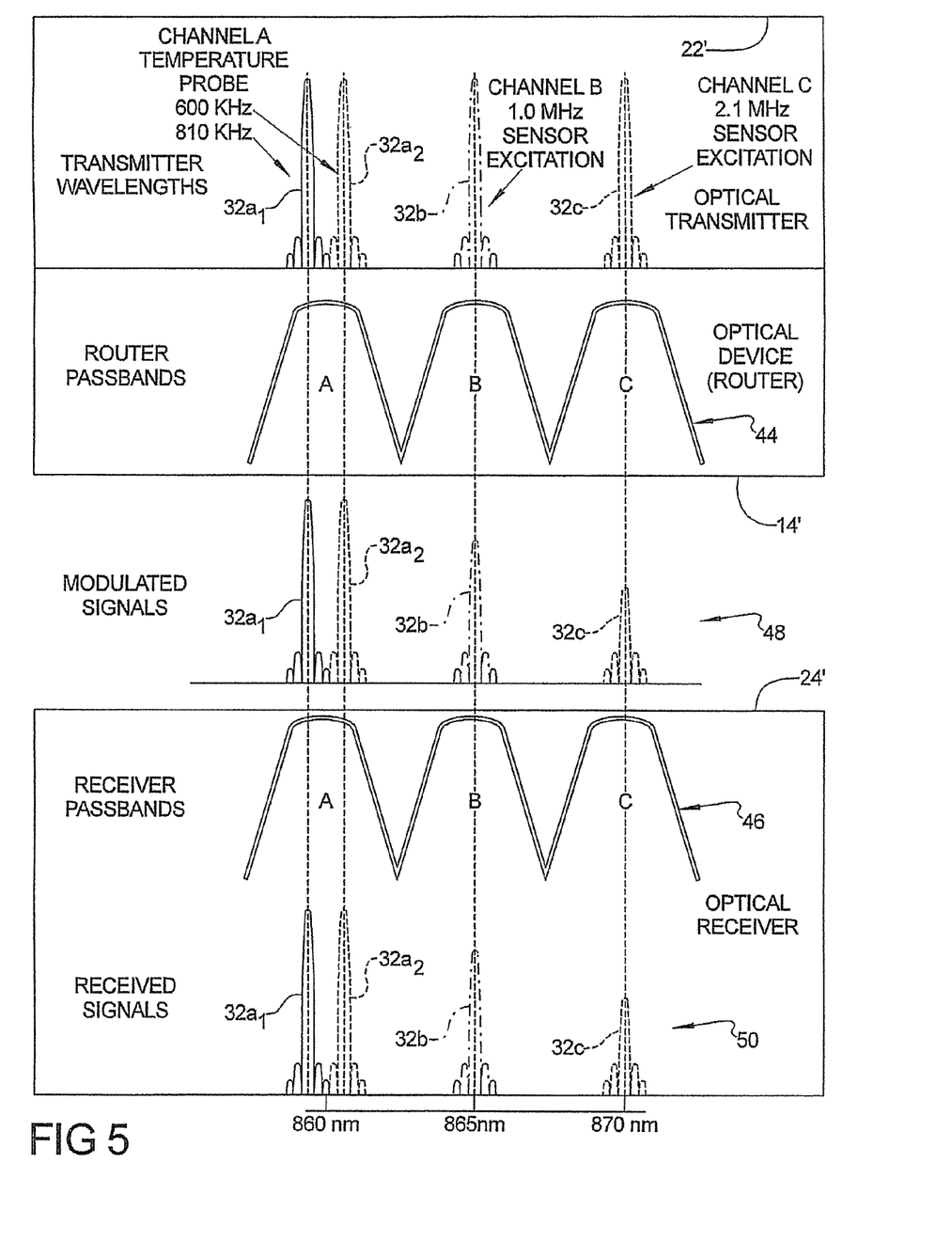
FIG. 5 is a waveform diagram of the optical signals having RF signals impressed thereon, and further illustrating when the passbands of the optical router are aligned with the passbands of the optical receiver.

Referring to FIG. 5, an example of the above-described modulation scheme is illustrated. An 810 KHz signal is impressed on optical signal $32a_1$. A 600 KHz signal is impressed on optical signal $32a_2$. A 1.0 MHz signal is impressed on optical signal 32b, and a 2.1 MHz excitation signal is impressed on signal 32c. For convenience, optical signals $32a_1$ and $32a_2$ can be viewed as being placed on channel "A". Optical signal 32b can be viewed as being placed on an optical channel "B", and optical signal 32c on channel "C". The passbands of the router 14' are designated by waveform 44. The passbands of the receiver 24' are designated by waveform 46. The specific frequencies above are merely exemplary and may be varied.

When the passbands 44 of the optical device 14' are aligned with the wavelength centers of the signals 32 generated by the transmitter 22', the modulated signals appear as indicated by reference numeral 48 in FIG. 5. The optical signals 32a-32c are centered within their respective passbands 44. Since the receiver 24 passbands 46 are aligned with the router passbands 44, the signals received by the optical receiver appear as indicated by reference numeral 50. The RF modulated optical signals 32a-32c remain centered within the receiver passbands 46 and are substantially of the same magnitudes as indicated by reference numeral 48. It will be noted, however, that the RF modulated optical signals 32a-32c, as indicated by reference numeral 48, are reduced slightly in magnitude, as compared to the signals 32a-32c output by the transmitter 22'.

Figure 6:
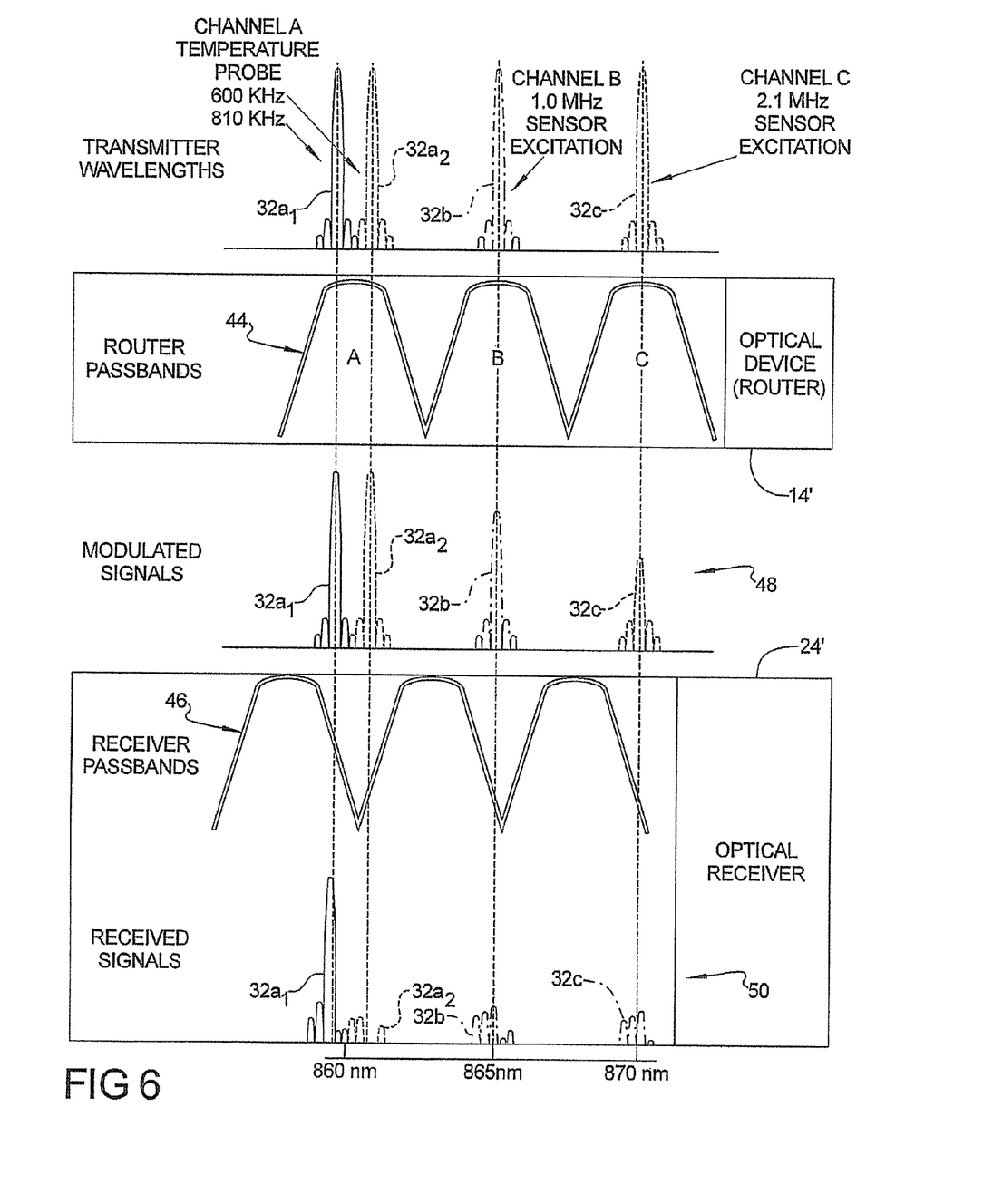
FIG. 6 is a graph illustrating the effect on the optical signals when the optical receiver passbands are misaligned with the optical router passbands.

Referring now to FIG. 6, the effect on the RF modulated optical signals 32a-32c can be seen when the router passbands 44 do not align with the passbands 46 of the optical receiver 24'. The RF modulated output signals 32a-32c, as indicated by reference numeral 48, are still aligned with the router passbands 44. However, due to the shift of the receiver passbands 46, the RF modulated optical signals 32a-32c now have drifted or "bled" into adjacent channels. Specifically, a portion of signal $32a_2$ has now drifted into channel B, and a portion of signal 32b has drifted into channel C. In this example, the optical receiver 24' may be located in an avionics bay, near the transmitter 22', and will therefore not be as hot as the filters in the optical router 14', which are located in a considerably warmer, remote location of the mobile platform 12.

Modulating RF signals of different frequencies onto the optical signals 32a-32c allows the processor 42 (FIG. 4) to detect when an unwanted signal is present within a given optical channel and to cancel (i.e., reject) that portion of the signal within a given channel. Thus, processor 42 rejects that portion of optical signal $32a_2$ that is present within channel B in FIG. 6. Similarly, the processor 42 rejects that portion of optical signal 32b that is present within channel C.

Figure 7:
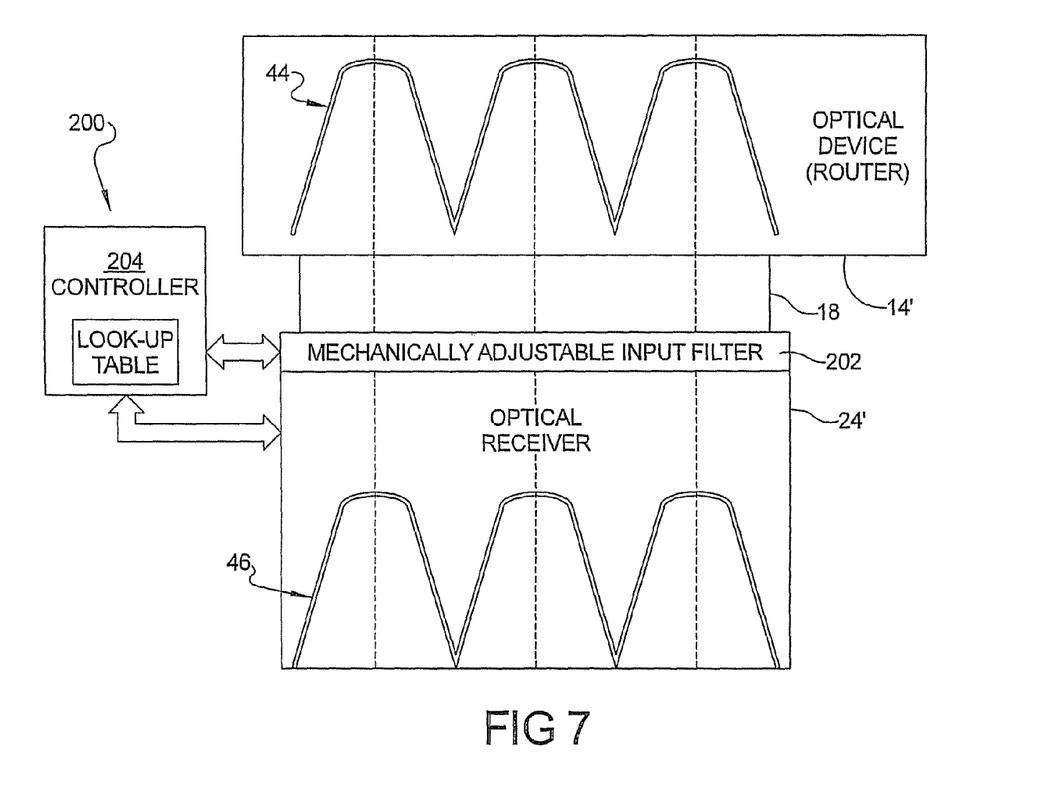
FIG. 7 is yet another alternative preferred embodiment of the present invention incorporating a filter positioned at an input of the optical receiver for controllably shifting the wavelength bands of the optical signals being received by the receiver to compensate for thermal drifting of the passbands of the optical router.

Since the signals received by the optical receiver 24' in FIG. 6 have also been attenuated significantly, the receiver 24' also makes a magnitude compensation to the received signals designated by reference numeral 50 in FIG. 6. One way of achieving this compensation is by directly measuring a temperature of the optical receiver 14' using a suitable temperature sensor 42a in communication with the processor 42. If the characteristics of the filter of the optical receiver 24' are known, then the difference in temperature between the optical router 14' and the optical receiver 24' can be determined. A suitable look-up table can be used which includes magnitude correction values dependent upon the temperature to correct for the signal attenuation caused by the mismatch of the receiver passbands Referring to FIG. 7, another alternative preferred embodiment of the present invention is illustrated and represented by reference numeral 200. This approach does not make use of impressing RF modulation signals onto the optical signals 32a-32c as described in connection with FIGS. 4-6, but instead uses a mechanically adjustable input filter 202 to shift the passbands 46 at an input side of the optical receiver 24'. The mechanically adjustable input filter 202 is controlled by a controller 204 that monitors operation of the optical receiver 24', and more particularly its temperature, and uses the temperature information to apply suitable control signals to alter the mechanically adjustable input filter 202 as needed to achieve the needed degree of passband 46 shifting. The mechanically adjustable input filter 202 may comprise devices as diverse as Bragg gratings, Fabry-Perot etalons, Surface Acoustic Wave devices, and Micro-Electro-Mechanical Machine gratings. The mechanically adjustable input filter 202 may be physically altered in position relative to the optical receiver 24' to achieve the needed degree of shifting of the passbands 46. Alternatively, it may be physically deformed such as by mechanical stretching or compression, which also will cause the needed shifting of the passbands 46. In this implementation the controller 204 also makes use of a look-up table which includes information correlating the temperatures of the optical transmitter and receiver 24', and the transmission characteristics of the filters in the optical device 14' and the receiver. With that information, it is possible for the controller to determine the wavelength shift of the device 14' and alter the emission wavelengths of the transmitter and the passbands of the receiver 24' to center each signal in each passband of the optical device 14'.

Figure 8:
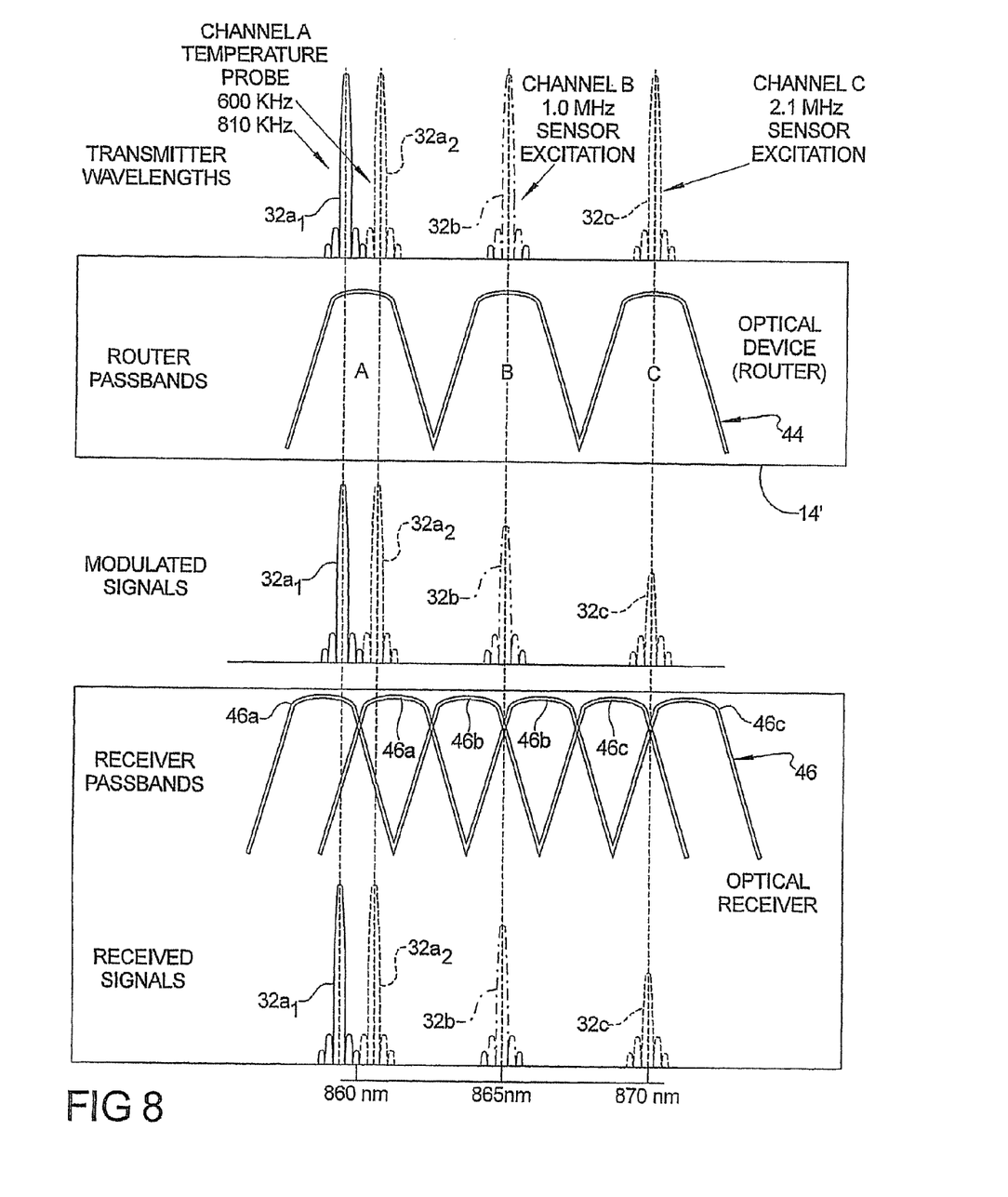
FIG. 8 is a graph illustrating yet another alternative preferred implementation of the present invention in which a greater number of receive channels than transmit channels are used for receiving the optical signals at the optical receiver.

Referring to FIG. 8, an alternative implementation of the system 100 described in connection with FIGS. 4-6 will now be described that involves the use of a greater number of receive passbands (i.e., channels) 46 than router passbands 44. In this example, there are two receive passbands 46a assigned for channel A, two passbands 46b assigned for channel B and two passbands 46c assigned for channel C. Thus, there are two receive passbands for each one of the router passbands (i.e., channels) 44. The use of multiple receive channels for each channel of the optical router 14' is beneficial because of the signal attenuation that occurs when the receive passbands 46 are misaligned with the router passbands 44. The optical receiver 24' still needs to make sense of the signals present within each of the passbands 46. However, instead of using analytic compensation as described in connection with the system 100 of FIGS. 4-6, the use of multiple receive channels for each passband of the router 14' allows the signals 32 present within each passband of the optical router 14' to be strongly detected by the optical receiver 24'. This approach also avoids the need to change the gain of the receive amplifiers used within the optical receiver 24', which would otherwise be needed to compensate for the weak optical signals 32a-32c received by the optical receiver 24', but at the cost of increased noise in the receiver 24'. Since there are no "deadbands" or "gaps" between the receiver passbands 46 where a signal (or portion of a signal) may be lost, the signals 32a-32c can be detected more readily. While two receive channels are shown for each router passband, it will be appreciated that any multiple of receive channels could be employed. Thus, three, four or more receive passbands per router passband could be employed. From a practical standpoint, however, the maximum number of receive passbands that may be employed per router passband will depend largely on the bandwidth of each router passband.

With the multiple receive channel approach described in FIG. 8, the temperature of the transmitter 22' is still controlled as described in connection with the system of FIG. 4, however, no shifting of the passbands 46 of the receiver 24' is employed. When using multiple receive channels, however, the temperature of the optical router 14' will be sensed in two ways. The first is to compare the ratio of the two signals that appears in only the first passband (channel A). This is the method identified previously. In practice, it is only reliable if the drift of the passband with respect to the two signals is so small that though one signal is in the roll-off region of the passband, and so is smaller than the signal near the center of the passband, the smaller signal is still fairly strong, such as greater than 50% of the strength of the strong signal. If the drift of the passbands is such that one signal is near the extreme edge of the passband, its strength at the detector in the receiver may be close to the noise level of the detection system. That means that the strength of the weak signal is more uncertain than the strength of the strong signal. Dividing the uncertain, weak signal by the certain, strong signal to obtain the ratio, and hence, the temperature, gives a value with the uncertainty of the weak signal. The second approach makes use of the large number of passbands of the present receiver 24'. It is useful for the case when drift of the passbands is large. In that case, rather than use the very weak signal that is passed by the filter in the first passband, it is better to use the stronger version of the same signal that is passed by the filter in the adjacent passband. Thus to obtain an accurate temperature for the router 14' if its temperature-induced drift is small, the ratio of the two optical signals $32a_1$ and $32b_1$ appearing in the first passband (channel A) is used, but for large drifts, the strength of the signal $32a_1$ in the first passband (channel A) is compared with the strength of the signal $32a_2$ in the second (adjacent) passband (channel B).

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method for correcting for optical channel bandwidth misalignment between output passbands of a first optical device and input passbands of a second optical device, the method comprising:

transmitting a plurality of optical signals from said output passbands of said first optical device, each of said optical signals being transmitted within an associated one of said passbands of said output;

receiving said first plurality of optical signals within said input passbands of said second optical device;

analyzing said optical signals to determine if said passbands of said first optical device or said second optical device has shifted;

altering a characteristic of a filter through which said optical signals pass to cause a needed degree of shifting of wavelength bands of said optical signals to bring said optical signals into alignment within said passbands of said second optical device, and wherein said altering a characteristic of a filter comprises using a controller configured to:

mechanically physically shift a position of said filter as needed to shift said wavelength bands of said optical signals; and mechanically physically deform said filter as needed to shift said wavelength bands of said optical signals.

2. The method of claim 1, wherein said physically deforming said filter comprises at least one of mechanically compressing and stretching the filter.

3. The method of claim 1, further comprising using a lookup table in communication with a controller to supply information to said controller such that said controller is able to use said information to control the filter.

4. The method of claim 3, wherein said information contained in said lookup table includes predetermined information correlating temperatures of the first optical device and the second optical device, and transmission characteristics of the filter, and wherein the predetermined information enables the controller to control the characteristic of the filter as needed to shift said wavelength bands.

5. The method of claim 1, wherein said altering a characteristic of a filter comprises altering a characteristic of at least one of a Bragg grating, a Fabry-Perot etalon, a surface acoustic wave device, and a micro-electro-mechanical machine grating.

6. A method implemented via a controller for correcting for optical channel bandwidth misalignment between output passbands of a first optical device and input passbands of a second optical device, the method comprising:

transmitting a plurality of optical signals from said output passbands of said first optical device, each of said optical signals being transmitted within an associated one of said passbands of said output;

disposing a filter between said first and second optical devices such that said optical signals are required to pass through said filter prior to being received by said second optical device;

receiving said first plurality of optical signals within said input passbands of said second optical device;

using the controller to obtain stored information from a lookup table to analyze said optical signals to determine if said passbands of said first optical device or said second optical device has shifted; and using said controller and said stored information obtained from said lookup table to:

mechanically physically alter a position of said filter through which said optical signals pass, to cause a needed degree of shifting of wavelength bands of said optical signals to bring said optical signals into alignment within said passbands of said second optical device; and mechanically physically deform said filter to cause the needed degree of shifting of wavelength bands of said optical signals.

7. The method of claim 6, wherein said mechanically deforming said filter comprises at least one of mechanically compressing and stretching of the filter.

8. The method of claim 6, wherein said stored information contained in said lookup table includes predetermined information correlating temperatures of the first optical device and the second optical device.

9. The method of claim 8, wherein said stored information contained in said lookup table further includes transmission characteristics of the filter, and wherein the predetermined information enables the controller to control a characteristic of the filter as needed to shift said wavelength bands to bring said optical signals transmitted from said first optical device into alignment with said passbands of said second optical device.

10. The method of claim 9, wherein said altering a characteristic of a filter comprises altering a characteristic of at least one of a Bragg grating, a Fabry-Perot etalon, a surface acoustic wave device, and a micro-electro-mechanical machine grating.

11. A method implemented via a controller for correcting for optical channel bandwidth misalignment between output passbands of a first optical device and input passbands of a second optical device, the method comprising:

transmitting a plurality of optical signals from said output passbands of said first optical device, each of said optical signals being transmitted within an associated one of said passbands of said output;

disposing a filter between said first and second optical devices such that said optical signals are required to pass through said filter prior to being received by said second optical device;

receiving said first plurality of optical signals within said input passbands of said second optical device;

causing said controller to use using information stored in a lookup table to analyze said received first plurality of optical signals to determine if a passband of said first optical device or said second optical device has shifted;

causing said controller to use said stored information to control altering a position of a filter through which said optical signals pass to cause a needed degree of shifting of wavelength bands of said optical signals to bring said optical signals into alignment within said passbands of said second optical device; and wherein said altering a characteristic of a filter comprises using a controller configured to:

mechanically physically shift a position of said filter, in accordance with said information from said lookup table, as needed to shift said wavelength bands of said optical signals; and mechanically physically deform said filter, in accordance with the information from said lookup table, as needed to shift said wavelength bands of said optical signals.

12. The method of claim 11, wherein said using stored information further comprises using predetermined information pertaining to transmission characteristics of the filter, and wherein the predetermined information enables the controller to control a characteristic of the filter as needed to shift said wavelength bands to bring said optical signals transmitted from said first optical device into alignment with said passbands of said second optical device.

13. The method of claim 11, wherein said disposing a filter comprises disposing at least one of a Bragg grating, a Fabry-Perot etalon, a surface-acoustic wave device and a microelectromechanical machine grating.

* * * * *